United States Patent
Ayzenshtat et al.

(10) Patent No.: US 11,106,765 B2
(45) Date of Patent: Aug. 31, 2021

(54) METHODS, APPARATUS, AND ARTICLES OF MANUFACTURE TO ENCODE AUXILIARY DATA INTO RELATIONAL DATABASE KEYS AND METHODS, APPARATUS, AND ARTICLES OF MANUFACTURE TO OBTAIN ENCODED DATA FROM RELATIONAL DATABASE KEYS

(71) Applicant: The Nielsen Company (US), LLC, New York, NY (US)

(72) Inventors: Leonid Ayzenshtat, Jacksonville, FL (US); Nikolay Georgiev, San Jose, CA (US); Kalyanaraman Rajamani, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 236 days.

(21) Appl. No.: 15/973,098

(22) Filed: May 7, 2018

(65) Prior Publication Data

US 2018/0253537 A1    Sep. 6, 2018

Related U.S. Application Data

(63) Continuation of application No. 13/691,515, filed on Nov. 30, 2012, now Pat. No. 9,990,478.

(51) Int. Cl.
   *G06F 21/16* (2013.01)
   *G06F 21/10* (2013.01)

(52) U.S. Cl.
   CPC ............. *G06F 21/16* (2013.01); *G06F 21/10* (2013.01)

(58) Field of Classification Search
   CPC ............. G06F 21/10; G06F 21/16; G06T 2201/0053–0601; G06T 1/005; G06T 1/0064; G06T 1/0071; G06T 1/0078; G06T 1/0092; H03M 13/159; H04L 2209/608;
   (Continued)

(56) References Cited

U.S. PATENT DOCUMENTS

| 4,906,991 A | 3/1990 | Fiala et al. |
| 5,239,298 A | 8/1993 | Wei |

(Continued)

OTHER PUBLICATIONS

Malkin et al., A Cryptographic Method for Secure Watermark Detection, Springer, Springer-Verlag Berlin Heidelberg 2007 (Year: 2006).*

(Continued)

*Primary Examiner* — Kambiz Zand
*Assistant Examiner* — Mahabub S Ahmed
(74) *Attorney, Agent, or Firm* — Hanley, Flight & Zimmerman, LLC

(57) ABSTRACT

Methods, apparatus, and articles of manufacture to encode auxiliary data into relational database keys and methods, apparatus, and articles of manufacture to obtain encoded data from relational database keys are disclosed. Example apparatus disclosed herein include a code determiner to divide a relational database key value into a first number of groups. Disclosed example apparatus also includes an encoded data determiner to determine remainders for respective ones of the groups based on corresponding incremental values, and modify the remainders to obtain the encoded data.

20 Claims, 7 Drawing Sheets

(58) Field of Classification Search
CPC . H04N 1/3231; H04N 1/3232; H04N 21/8358
USPC .......................................................... 726/32
See application file for complete search history.

(56) References Cited

U.S. PATENT DOCUMENTS

| | | | | |
|---|---|---|---|---|
| 5,297,206 | A * | 3/1994 | Orton | H04L 9/30 380/28 |
| 5,727,092 | A | 3/1998 | Sandford, II et al. | |
| 5,819,289 | A * | 10/1998 | Sanford, II | G06T 1/0028 |
| 5,937,066 | A | 8/1999 | Gennaro et al. | |
| 5,966,445 | A * | 10/1999 | Park, III | H04L 9/3257 713/180 |
| 5,970,140 | A * | 10/1999 | Sandford, II | G06T 1/0028 380/205 |
| 6,021,196 | A | 2/2000 | Sandford, II et al. | |
| 6,044,155 | A | 3/2000 | Thomlinson et al. | |
| 6,065,119 | A | 5/2000 | Sandford, II et al. | |
| 6,174,170 | B1 | 1/2001 | Olmedo | |
| 6,289,128 | B1 | 9/2001 | Allen | |
| 6,353,672 | B1 * | 3/2002 | Rhoads | G07F 7/1016 382/100 |
| 6,359,573 | B1 * | 3/2002 | Taruguchi | G10L 19/018 341/50 |
| 6,560,339 | B1 * | 5/2003 | Iwamura | H04N 7/1675 348/E7.056 |
| 6,754,822 | B1 * | 6/2004 | Zhao | G06F 21/10 713/176 |
| 6,778,682 | B2 | 8/2004 | Rhoads | |
| 7,123,718 | B1 * | 10/2006 | Moskowitz | G06T 1/005 380/205 |
| 7,164,778 | B1 * | 1/2007 | Nakamura | G06T 1/0028 382/100 |
| 7,197,156 | B1 * | 3/2007 | Levy | G06T 1/0028 382/100 |
| 7,287,216 | B1 * | 10/2007 | Lee | G06F 16/86 715/234 |
| 7,424,132 | B2 | 9/2008 | Rhoads | |
| 7,617,231 | B2 | 11/2009 | Moon et al. | |
| 7,730,037 | B2 * | 6/2010 | Jajodia | G06F 21/64 707/687 |
| 8,073,915 | B1 | 12/2011 | Nandy | |
| 8,082,320 | B1 * | 12/2011 | Moorer | H04L 1/0041 709/217 |
| 8,701,119 | B1 | 4/2014 | Ross | |
| 8,995,711 | B2 * | 3/2015 | Thorwirth | G06T 1/0092 382/100 |
| 9,042,554 | B2 | 5/2015 | Georgiev et al. | |
| 9,270,859 | B2 * | 2/2016 | Moskowitz | G06F 21/10 |
| 9,313,248 | B2 * | 4/2016 | Epstein | G06F 21/10 |
| 9,614,675 | B2 | 4/2017 | Georgiev et al. | |
| 2001/0037465 | A1 * | 11/2001 | Hart | H04N 21/2225 726/28 |
| 2001/0046298 | A1 * | 11/2001 | Terada | G11B 20/00891 380/252 |
| 2002/0056041 | A1 * | 5/2002 | Moskowitz | G06Q 30/06 713/176 |
| 2003/0014634 | A1 * | 1/2003 | Petrovic | H04N 1/32229 713/176 |
| 2003/0204729 | A1 * | 10/2003 | Rockwood | H04H 20/31 713/176 |
| 2003/0217272 | A1 | 11/2003 | Agrawal et al. | |
| 2004/0143742 | A1 * | 7/2004 | Muratani | G06T 1/005 713/176 |
| 2004/0210707 | A1 * | 10/2004 | Ohara | G11B 23/40 711/103 |
| 2005/0039021 | A1 | 2/2005 | Alattar et al. | |
| 2005/0055554 | A1 | 3/2005 | Sion et al. | |
| 2005/0094845 | A1 * | 5/2005 | Lee | G06T 1/0028 382/100 |
| 2005/0154893 | A1 * | 7/2005 | Muratani | G06T 1/005 713/176 |
| 2005/0175110 | A1 * | 8/2005 | Van Dijk | G11B 20/00086 375/242 |
| 2005/0257060 | A1 * | 11/2005 | Venkatesan | H04N 7/167 713/176 |
| 2006/0005029 | A1 * | 1/2006 | Petrovic | H04N 5/913 713/176 |
| 2006/0126891 | A1 * | 6/2006 | Seroussi | G06T 1/0035 382/100 |
| 2006/0233420 | A1 * | 10/2006 | Rhoads | G06Q 20/1235 382/100 |
| 2007/0064940 | A1 * | 3/2007 | Moskowitz | G06F 21/10 380/205 |
| 2007/0110237 | A1 * | 5/2007 | Tehranchi | H04N 21/2347 380/201 |
| 2007/0127769 | A1 * | 6/2007 | Inoue | G06T 1/0064 382/100 |
| 2008/0165958 | A1 * | 7/2008 | Matsushita | H04L 9/0891 380/44 |
| 2009/0013414 | A1 * | 1/2009 | Washington | G06F 21/10 726/32 |
| 2009/0115576 | A1 | 5/2009 | Schuessler | |
| 2009/0182890 | A1 * | 7/2009 | Moorer | H04N 21/234327 709/231 |
| 2010/0150394 | A1 * | 6/2010 | Bloom | G06T 1/0035 382/100 |
| 2010/0153734 | A1 * | 6/2010 | Moskowitz | G06T 1/0021 713/179 |
| 2010/0169652 | A1 * | 7/2010 | Butler | G06F 21/10 713/176 |
| 2011/0055166 | A1 * | 3/2011 | Stephenson | G06F 16/284 707/687 |
| 2011/0246505 | A1 | 10/2011 | Jung | |
| 2012/0030546 | A1 | 2/2012 | Alattar et al. | |
| 2012/0192059 | A1 | 7/2012 | Laskaris et al. | |
| 2012/0215684 | A1 * | 8/2012 | Kidron | G06F 15/167 705/39 |
| 2013/0060815 | A1 * | 3/2013 | Saeki | G06F 16/27 707/802 |
| 2014/0013120 | A1 * | 1/2014 | Luo | H04N 21/2347 713/176 |
| 2014/0153715 | A1 | 6/2014 | Georgiev et al. | |
| 2014/0157439 | A1 | 6/2014 | Ayzenshtat et al. | |
| 2014/0157440 | A1 | 6/2014 | Georgiev et al. | |
| 2014/0157441 | A1 | 6/2014 | Georgiev et al. | |
| 2014/0325233 | A1 * | 10/2014 | Carlson | H04L 63/0428 713/176 |
| 2015/0078150 | A1 * | 3/2015 | Moreno De Ayala | H04L 7/043 370/208 |
| 2015/0236854 | A1 | 8/2015 | Georgiev et al. | |
| 2015/0261943 | A1 | 9/2015 | Georgiev et al. | |

OTHER PUBLICATIONS

Ammar, et al., A Novel Data Hiding Technique Using Residue Number System, National Radio Science Conference, Egypt 2003 (Year: 2003).*

Tzouramanis, Robust Watermarking Scheme for Relational Databases, IEEE (Year: 2011).*

Priyanka et al., CRT and ART Based Watermarking Scheme in DCT Domain, International Journal of Engineering and Advanced Technology (IJEAT) (Year: 2012).*

Singh, Digital Watermarking: A Tutorial, Cyber Journals: Multidisciplinary Journals in Science and Technology, Journal of Selected Areas in Telecommunications (JSAT), January Edition, 2011 (Year: 2011).*

Zhang et al., Relational Databases Watermarking for textual and numerical data, 2011 International Conference on Mechatronic Science, Electric Engineering and Computer Aug. 19-22, 2011, Jilin, China (Year: 2011).*

Atta-ur-Rahman et al., Reversible Watermarking using Residue Number System, IEEE (Year: 2011).*

Saha et al., Steganographic Techniques of Data Hiding using Digital Images, Defence Science Journal, vol. 62, No. 1, Jan. 2012, pp. 11-18, DOI: 10.14429/dsj.62.1436 (Year: 2012).*

(56) References Cited

OTHER PUBLICATIONS

Hassanein et al., Text Fingerprint Key Generation, The 7th International Conference for Internet Technology and Secured Transactions (ICITST-2012) (Year: 2012).*

Qin et al., Watermark Based Copyright Protection of Outsourced Database, IEEE (Year: 2006).*

Agrawal et al., Watermarking relational data: framework, algorithms and analysis, The VLDB Journal (2003) 12: 157-169 / Digital Object Identifier (DOI) 10.1007/s00778-003-0097-x, Springer (Year: 2003).*

Beattie, "Nielsen/IRI Intro Session," retrieved from http://faculty.gugua.duke.edu/~moorman/GeneralMills/Section1/Julie%20Beattie%20Nielsen.ppt, dated unknown, 38 pages.

Lopinto, "Color Choice: Luminance, Chrominance And Hue: Among the tools at your disposal, the LCH Editor gives you a powerful weapon for finessing the color relationships in your images," Digital Photo Pro, retrieved from http://www.digitalphotopro.com/technique/software-technique/color-choice-luminance-chrominance-and-hue.html?start=2, published Mar. 3, 2008, 2 pages.

Singh, "Digital Watermarking: A Tutorial," Cyber Journals: Multidisciplinary Journals in Science and Technology, Journal of Selected Areas in Telecommunications (JSAT), January Edition, 2011, retrieved from http://www.cyberjournals.com/Papers/Jan2011/02.pdf, 12 pages.

Codr, "Unseen: An Overview of Steganopgraphy and Presentation of Associated Java Application C-Hide," retrieved from http://www.cse.wustl.edu/~jain/cse571-09/ftp/stegano/index.html on Nov. 27, 2012, 22 pages.

Kessler, "Steganography: Hiding Data Within Data," Sep. 2001, retrieved from http://www.garykessler.net/library/steganography.html on Nov. 27, 2012, 5 pages.

Jebran, "Text 2Text Steganography—Part 2," Code Project, retrieved from http://www.codeproject.com/Articles/19260/Text-2Text-Steganography-Part-2, published Jun. 19, 2007, 8 pages.

Compris, "TextMark—Protect your texts with digital watermarks!" retrieved from http://www.compris.com/TextMark/en/index.html on Nov. 27, 2012, 3 pages.

Kwan, "Whitespace steganography," The SNOW Home Page, retrieved from http://www.darkside.com.au/snow/index.html, last modified on Dec. 19 2009, 2 pages.

Coderrr, "Simple text watermarking with Unicode," retrieved from http://coderrr.wordpress.com/2008/03/23/simple-text-watermarking-with-unicode/, published Mar. 23, 2008, 4 pages.

Topkara et al., "Natural Language Watermarking," retrieved from http://homes.cerias.purdue.edu/~mercan/spie05_5681-45_paper.pdf, date unknown, 12 pages.

Van De Moortel, "Permutations-Variations-Combinations," retrieved from http://users.telenet.be/vdmoortel/dirk/Maths/PermVarComb.html, 2003, 1 page.

Ishida, "Unicode controls vs. markup for bidi support," W3C Internationalization, retrieved from http://www.w3.org/International/questions/qa-bidi-controls.en.php, published Jun. 13, 2003, 5 pages.

Watermarker, "How to protect digital works: images, photos and documents: comparison of watermarking methods and tools," retrieved from http://www.watermarker.com/how-to-project-digital-images.aspx on Nov. 29, 2012, 2 pages.

Digimarc, "Manage, monitor and monetize your digital photos, images and artwork," Digimarc for Images, retrieved from http://www.digimarc.com/digimarc-for-images on Nov. 29, 2012, 2 pages.

Encoffice, "How safe is Excel encryption. Is it really secure?" Linker IT Software, retrieved from http://www.oraxcel.com/projects/encoffice/help/How_safe_is_Excel_encryption.html on Nov. 29, 2012, 3 pages.

Encoffice, "How secure is Microsoft Word 2007 encryption," Linker IT Software, retrieved from http://www.oraxcel.com/projects/encoffice/help/How_safe_is_Word_2007_encryption.html on Nov. 29, 2012, 3 pages.

Rixler Software, "MS Office Password Recovery Software," retrieved from http://www.rixler.com/ms_office_password_recovery_software.htm on Nov. 29, 2012, 1 page.

Office Password Recovery, "Stellar Phoenix Office Password Recovery Pro," retrieved from http://www.officepasswordrecover.com/ on Nov. 29, 2012, 2 pages.

Fisher, "3 Free Word Password Recovery Tools: Free Word Password Recovery, Remover, and Unlocker Tools for Windows," About.com, retrieved from http://pcsupport.about.com/od/toolsofthetrade/tp/word-password-recovery.htm on Nov. 29, 2012, 2 pages.

Easy Password Fix, "Recover Microsoft Office Passwords in under 2 Minutes!" Wayback Machine Cache of http://www.easypasswordfix.com taken on Feb. 7, 2011, 2 pages.

Kangas, "The Light of Knowledge," LuxSci FYI Blog, retrieved from http://luxsci.com/blog/how-secure-are-password-protected-files.html on Nov. 29, 2012, 2 pages.

Wikipedia, "Password strength," retrieved from http://en.wikipedia.org/wiki/Password_strength on Nov. 29, 2012, 10 pages.

Agarwal, "How to Open Password Protected PDF Documents," Digital Inspiration, retrieved from http://labnol.blogspot.com/2007/01/how-to-open-password-protected-pdf.html, published Jan. 2007, 2 pages.

Semjanov, "How to remove security from secured PDF file," GuaPDF, retrieved from http://www.guapdf.com/, last updated Jul. 13, 2012, 6 pages.

Hanyaloglu, "Digitally Signing PDF Documents Using Adobe Acrobat 9*: An Introduction," ScanSnap Community, retrieved from http://scansnapcommunity.com/tips-tricks/1416-digitally-signing-pdf-documents-using-adobe-acrobat-9-an-introduction, published Nov. 16, 2009, 9 pages.

Information Rights Management in Office 2010. Accessed from http://office.microsoft.com/en-us/excel-help/information-rights-management-in-office-2010-HA010354260.aspx on Nov. 30, 2012, 5 pages.

Anderson, "What is: Information Rights Management?" retrieved from http://office.microsoft.com/en-us/excel-help/information-rights-management-in-office-2010-HA010354260.aspx on date unknown, 3 pages.

Adobe, "Adobe LiveCycle Rights Management ES3," retrieved from http://www.adobe.com/products/livecycle/rightsmanagement on Nov. 29, 2012, 3 pages.

Adobe, "The benefit of rights management: A guide to Adobe® LiveCycle® Rights Management ES software," retrieved from http://www.adobe.com/products/livecycle/pdfs/95010482_lc_rightsmgmt_wp_ue.pdf, published 2008, 8 pages.

Armjisoft, "PDF DRM, Security and Rights Management Systems," retrieved from http://www.armjisoft.com/?page=pdfownerguard on Nov. 29, 2012, 4 pages.

Vitrium, "PDF Protection, Control & Tracking," Vitrium Systems, retrieved from http://www.vitrium.com/ on Nov. 29, 2012, 4 pages.

Codeandsoft, "Products and solutions," retrieved from http://www.codeandsoft.com on Nov. 29, 2012, 1 page.

Locklizard, "Document Security—Digital Rights Management (DRM) & Copy Protection Software," retrieved from http://www.locklizard.com/ on Nov. 29, 2012, 2 pages.

Allen, "Rights Management for Standard Document Formats," FileOpen Document Security Blog, retrieved from http://www.fileopen.com/blog, published Oct. 29, 2012, 4 pages.

Por et al., "UniSpaCh: A text-based data hiding method using Unicode space characters," The Journal of Systems and Software 85, pp. 1075-1082, published May 2012, 8 pages.

Bender, et al., "Techniques for Data Hiding," IBM Systems Journal, vol. 35, Nos. 3&4, 1996, pp. 313-336, 24 pages.

United States Patent and Trademark Office, "Non-Final Office Action," issued in connection with U.S. Appl. No. 13/691,519, dated Jul. 16, 2014, 25 pages.

Tzouramanis, "A Robust Watermarking Scheme for Relational Databases," 6th International Conference on Internet Technology and Secured Transactions, Dec. 11-14, 2011, Abu Dhabi, UAE, 8 pages.

United States Patent and Trademark Office, "Non-Final Office Action," issued in connection with U.S. Appl. No. 13/691,515, dated Jul. 28, 2014, 32 pages.

Kamel et al., "A Lightweight Data Integrity Scheme for Sensor Networks," published Apr. 7, 2011, 19 pages.

(56) References Cited

OTHER PUBLICATIONS

Qin et al., "Watermark Based Copyright Protection of Outsourced Database," 10$^{th}$ International Database Engineering and Applications Symposium, 2006, 5 pages.

United States Patent and Trademark Office, "Non-Final Office Action," issued in connection with U.S. Appl. No. 13/691,510, dated Jul. 18, 2014, 13 pages.

United States Patent and Trademark Office, "Non-Final Office Action," issued in connection with U.S. Appl. No. 13/691,522, dated Aug. 15, 2014, 13 pages.

IP Australia, "Patent Examination Report No. 1," issued in connection with Application No. 2013204220, dated Jul. 25, 2014, 3 pages.

IP Australia, "Patent Examination Report No. 1," issued in connection with Application No. 2013204619, dated Aug. 28, 2014, 3 pages.

IP Australia, "Patent Examination Report No. 1," issued in connection with Application No. 2013204226, dated Dec. 17, 2014, 4 pages.

IP Australia, "Patent Examination Report No. 1," issued in connection with Application No. 2013204479, dated Dec. 12, 2014, 4 pages.

United States Patent and Trademark Office, "Final Office Action," issued in connection with U.S. Appl. No. 13/691,515, dated Mar. 3, 2015, 40 pages.

United States Patent and Trademark Office, "Notice of Allowance," issued in connection with U.S. Appl. No. 13/691,510, dated Jan. 20, 2015, 8 pages.

United States Patent and Trademark Office, "Notice of Allowance," issued in connection with U.S. Appl. No. 13/691,522, dated Mar. 30, 2015, 10 pages.

United States Patent and Trademark Office, "Supplemental Notice of Allowability," issued in connection with U.S. Appl. No. 13/691,510, dated Apr. 2, 2015, 9 pages.

United States Patent and Trademark Office, "Supplemental Notice of Allowability," issued in connection with U.S. Appl. No. 13/691,510, dated May 1, 2015, 9 pages.

IP Australia, "Patent Examination Report No. 2," issued in connection with Application No. 2013204220, dated Jun. 4, 2015, 2 pages.

IP Australia, "Notice of Acceptance," issued in connection with Application No. 2013204619, dated Jun. 3, 2015, 2 pages.

United States Patent and Trademark Office, "Advisory Action," issued in connection with U.S. Appl. No. 13/691,515, dated Jun. 17, 2015, 4 pages.

IP Australia, "Notice of Acceptance," issued in connection with Application No. 2013204226, dated Jun. 26, 2015, 2 pages.

IP Australia, "Notice of Acceptance," issued in connection with Application No. 2013204220, dated Jul. 23, 2015, 2 pages.

United States Patent and Trademark Office, "Non-Final Office Action," issued in connection with U.S. Appl. No. 14/705,595, dated Mar. 7, 2016, 16 pages.

United States Patent and Trademark Office, "Non-Final Office Action," issued in connection with U.S. Appl. No. 13/691,515, dated Apr. 21, 2016, 9 pages.

United States Patent and Trademark Office, "Final Office Action," issued in connection with U.S. Appl. No. 14/705,595, dated Aug. 23, 2016, 18 pages.

United States Patent and Trademark Office, "Final Office Action," issued in connection with U.S. Appl. No. 13/691,515, dated Nov. 10, 2016, 9 pages.

United States Patent and Trademark Office, "Notice of Allowance," issued in connection with U.S. Appl. No. 14/705,595, dated Nov. 21, 2016, 18 pages.

United States Patent and Trademark Office, "Non-Final Office Action," issued in connection with U.S. Appl. No. 14/728,532, dated Jun. 30, 2017, 9 pages.

United States Patent and Trademark Office, "Non-Final Office Action," issued in connection with U.S. Appl. No. 13/691,515, dated Aug. 14, 2017, 12 pages.

United States Patent and Trademark Office, "Non-Final Office Action," issued in connection with U.S. Appl. No. 14/728,532, dated Jan. 16, 2018, 6 pages.

United States Patent and Trademark Office, "Notice of Allowance," issued in connection with U.S. Appl. No. 13/691,515, dated Feb. 5, 2018, 13 pages.

\* cited by examiner

METHODS, APPARATUS, AND ARTICLES OF MANUFACTURE TO ENCODE AUXILIARY DATA INTO RELATIONAL DATABASE KEYS AND METHODS, APPARATUS, AND ARTICLES OF MANUFACTURE TO OBTAIN ENCODED DATA FROM RELATIONAL DATABASE KEYS

RELATED APPLICATIONS

This patent arises from a continuation of U.S. patent application Ser. No. 13/691,515, filed Nov. 30, 2012. The entirety of U.S. patent application Ser. No. 13/691,515 is incorporated herein by reference.

FIELD OF THE DISCLOSURE

This disclosure relates generally to data encoding, and, more particularly, to methods, apparatus, and articles of manufacture for encoding auxiliary information in relational database keys and to methods, apparatus, and articles of manufacture for obtaining encoded auxiliary information from relational database keys.

BACKGROUND

Proprietary data is sometimes shared between two parties. In some cases, the proprietary data owned by one party is easily copied or distributed by the other party to additional parties without consent of the owner.

DETAILED DESCRIPTION

Figure 1:
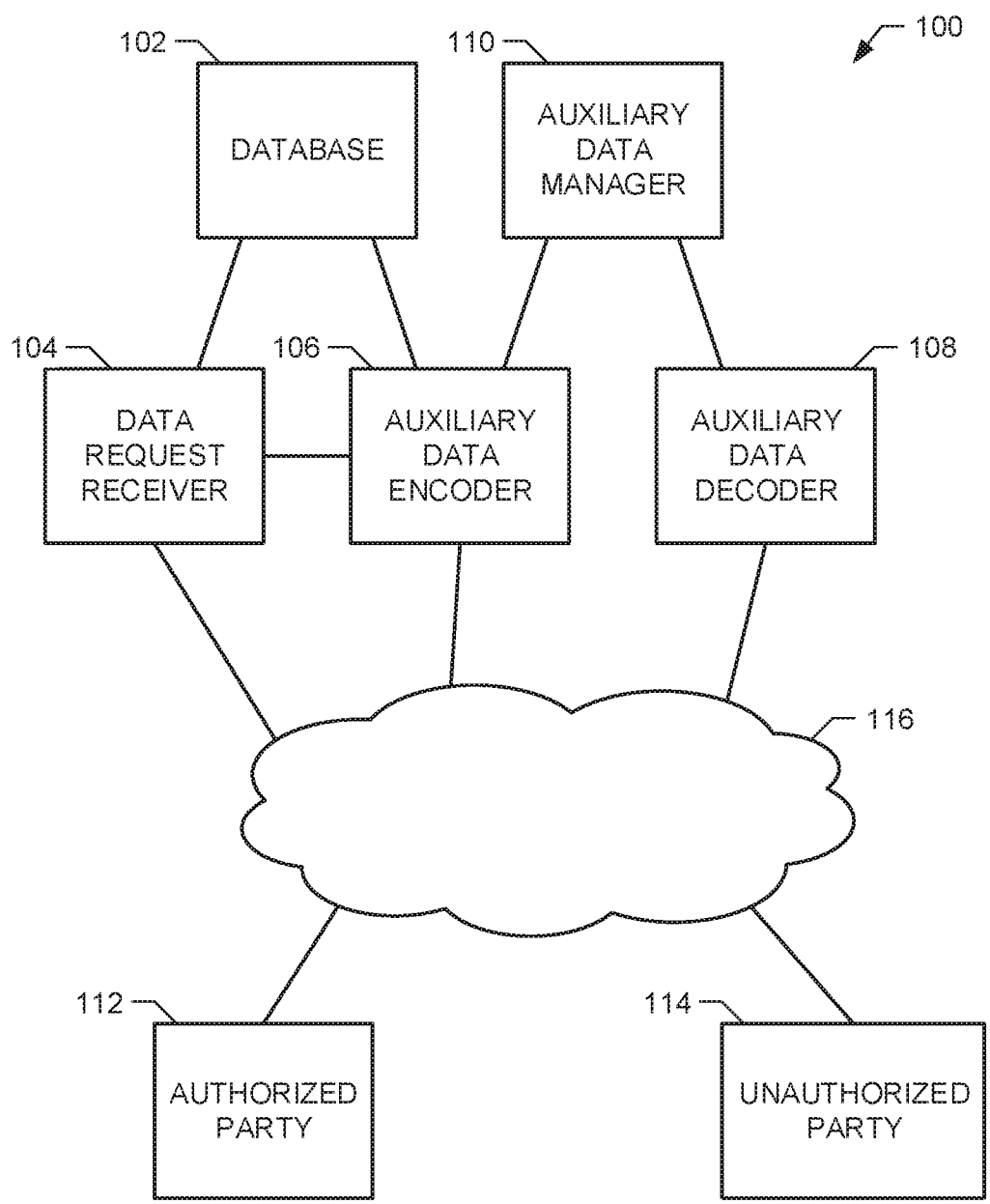
FIG. 1 is a block diagram of an example system in accordance with the teachings of this disclosure.

Data (whether copyrighted or not) can be distributed. However, once distributed a first time, the data is capable of being further distributed. Example methods, apparatus, and articles of manufacture disclosed herein enable an owner of data to uniquely identify, protect, and trace the data to detect cases of unauthorized copying or redistribution by embedding auxiliary data, also referred to herein as a watermark, in the data. In particular, example methods, apparatus, and articles of manufacture embed watermarks in the data in a robust manner, such that the watermark can still be recovered if a portion of the data is copied and/or if the data is reorganized.

When relational data is copied, relational keys are copied and/or generated with the data to appropriately link data elements in the relational data. The methods and apparatus in question embed auxiliary information in database relational keys. When a database or other relational data is distributed, the keys are provided in combination with the database data to provide the relational information, and copying the data includes copying the keys (if the data is to retain its meaning). As a result, copied data can later be analyzed to extract the data encoded in the keys.

Example methods, apparatus, and articles of manufacture enable content owners to secure the distributed content, prevent unauthorized usage of the data, and/or provide the means to combat copyright infringement. Example methods, apparatus, and articles of manufacture can be used, for example, to embed a watermark into all distributed data. In the event of unauthorized distribution, the watermark in the database keys can be decoded to prove the origin of the data. Example methods, apparatus, and articles of manufacture can also be used to embed a client specific fingerprint to personalize the copy of data. When data is found to have been improperly distributed, the specific fingerprint may be used to identify a party who was in possession of the data prior to the improper distribution.

As used herein, a relational database refers to a database that is organized and accessed according to relationships between data items. Relational data refers to data organized as a relational database, but is not necessarily limited to data existing within a database software system. As used herein, the term relational database keys, or simply keys, refers to a piece of data that indicates a relationship between items or pieces of relational data, and may include any type of unique key. As used herein, relational data is considered to include the corresponding keys that define the relationships between the items of data, because removing the keys from the relational data erases the indications of the relationships between the data and potentially reduces the value of the items of data (e.g., renders the items of data meaningless).

To embed auxiliary information into relational data, example methods, apparatus, and articles of manufacture disclosed herein represent the auxiliary information using numbers or codes, such as an American Standard Code for Information Interchange (ASCII) code or a number representative of an ASCII code (e.g., a four-digit number per character). For example, if 3 ASCII characters are to be embedded, the key field length is at least 12 digits. If 4 ASCII characters are to be embedded, the key field length will be at least 16 digits. Thus, to embed data consisting of a four-character symbol in the numeric keys, a 16 digit numeric base will be used.

A disclosed example method to encode auxiliary information into relational data includes dividing a code representative of auxiliary data into a plurality of groups, determining incremental values for the plurality of groups, generating a first key based on the code, and generating a subsequent key by modifying the first key based on the value of the first key and the incremental values. In some examples, the number of groups may correspond to and/or be representative of the number of characters present in the auxiliary data to be embedded.

An example method to obtain auxiliary data from relational data includes dividing a relational database key value into a first number of groups, determining respective remainders for the groups based on corresponding divisors, and modifying the remainders to obtain auxiliary data. In some examples, generating the subsequent key includes generating a value for the subsequent key such that a modulo operation of the first key and the subsequent key based on the incremental values have identical results.

An example apparatus to encode auxiliary data into relational data includes a code generator to generate a code comprising a plurality of groups and representative of auxiliary information, an increment determiner to determine incremental values for the plurality of groups, and a database key generator to generate a first key based on the code, and to generate a subsequent key such that a group of the subsequent key differs from a corresponding group of the first key by a multiple of a corresponding incremental value for the group.

An apparatus to obtain encoded data from relational data includes a code determiner to divide a relational database key value into a first number of groups, and an encoded data determiner to determine respective remainders for the groups based on corresponding divisors and to modify the remainders to obtain encoded data.

While certain examples are illustrated below with the use of example auxiliary data, example base numbers, example incremental values, and/or example operations, the example methods, apparatus, and articles of manufacture disclosed herein can be used for any auxiliary data, base numbers, incremental values, and/or operations within the scope of the claims. For example, the use of a different set of auxiliary data may also result in the use of different base numbers, different base algorithms, different incremental values (e.g., divisors, moduli), and/or different operations, which may be passed as parameters to an auxiliary data encoder and/or database key generator.

Example methods, apparatus, and articles of manufacture disclosed herein enable the auxiliary information to be recovered from any of the database keys. In some examples, multiple ones of the database keys may be decoded to verify the presence of the auxiliary information and/or to reduce the likelihood that a detection of encoded information in a database key is a false detection. Furthermore, example methods, apparatus, and articles of manufacture disclosed herein are robust because the auxiliary information can be recovered even if the relational data is divided split and/or portions of the relational data are copied rather than all of the relational data.

FIG. 1 is a block diagram of an example system 100. The example system 100 of FIG. 1 may be used to encode auxiliary information (e.g., watermarks) into relational data that may subsequently be distributed. The example system 100 may further decode relational database keys to recover or obtain auxiliary information encoded using the system 100. Thus, subsequent to distribution of the encoded relational data (e.g., including the database keys), the example system 100 can identify relational database keys that have been encoded using the system 100. When the data is distributed, the keys are included with the data to preserve the meaning of the data values.

The example system 100 of FIG. 1 includes a database 102, a data request receiver 104, an auxiliary data encoder 106, an auxiliary data decoder 108, and an auxiliary data manager 110. In the example of FIG. 1, the database 102, the data request receiver 104, the auxiliary data encoder 106, the auxiliary data decoder 108, and the auxiliary data manager 110 are owned or controlled by a single party (e.g., an owner or licensee of distributable data, a distributor of the data under the control of the owner or licensee of the data, etc.). In some other examples, the database 102, the data request receiver 104, the auxiliary data encoder 106, the auxiliary data decoder 108, and/or the auxiliary data manager 110 may represent a combination of multiple parties. The example system 100 further includes a party 112 authorized to receive data stored in the database 102 and a party 114 not authorized to receive such data. Any or all of the example database 102, the example data request receiver 104, the example auxiliary data encoder 106, the example auxiliary data decoder 108, the auxiliary data manager 110, and/or the example parties 112, 114 may be communicatively connected via a network 116 such as the Internet.

Any of the example blocks 102-110 of FIG. 1 may be combined, divided, and/or rearranged to form different blocks that perform fewer or more functions.

As mentioned above, the example database 102 stores data that may be distributed. In the example system 100, the data stored in the database 102 (also referred to herein as "source data") includes keys to relate various items of the data. The data stored in the database 102 may be updated to add new data, to modify data present in the database 102, and/or to delete data from the database 102. Each time a new relation between items of data is created, a new database key is created to identify or indicate the relationship. Similarly, keys may be deleted when relationships and/or data are deleted.

The example data request receiver 104 of FIG. 1 receives requests for data stored in the database 102. For example, the data request receiver 104 may receive a request via the network (e.g., from the authorized party 112 and/or other parties). Additionally or alternatively, the data request receiver 104 may receive requests via manual entry of the request into the data request receiver (e.g., by a person via a user interface). The example data request receiver 104 parses the request to determine the data to be transferred and/or determines whether the requesting party has authorization to receive the data. In the example of FIG. 1, the data to be sent or provided is data in the form of a relational database. For example, in response to a request the data request receiver 104 may construct a query of the database 102 to instruct the database and/or the auxiliary data encoder 106 which data is to be provided. When data is selected to be provided, the database 102 also provides the database keys relating the selected data.

In some examples, the keys stored in the database 102 are encoded with auxiliary information. In some other examples, the auxiliary data encoder 106 generates new database keys for distribution with the data, where the generated database keys are encoded with auxiliary information. The example auxiliary data encoder 106 of FIG. 1 receives the source data to be provided with database keys (e.g., as individual data units, as a set of data units, etc.), encodes auxiliary information into the database keys, and outputs the relational database data with the encoded database keys (e.g., for distribution, for storage, etc.). A more detailed example of the auxiliary data encoder 106 is described below in conjunction with FIG. 2.

The example auxiliary data decoder 108 of FIG. 1 obtains data in which auxiliary information may be present (e.g., suspect data) and attempts to extract the auxiliary information based on the method used by the auxiliary data encoder 106 to encode auxiliary data into the database keys. In some examples, the auxiliary data decoder 108 attempts to extract auxiliary data from the suspect data using multiple decoding methods, each decoding method being based on a method used by the auxiliary data encoder 106 to encode data but using different base numbers and/or different divisor numbers to decode the keys. The auxiliary data decoder 108 may obtain data to be decoded when, for example, the obtained data is suspected of having been distributed without authorization and/or the owner or source of the obtained data is to be demonstrated.

The example auxiliary data manager 110 of FIG. 1 provides auxiliary information to the auxiliary data encoder 106, which encodes the auxiliary information into database keys. The example auxiliary data manager 110 also receives extracted auxiliary information from the auxiliary data decoder 108. The auxiliary data manager 110 compares extracted auxiliary information to auxiliary information provided to the auxiliary data encoder 106 to determine whether a match exists between auxiliary information provided to the auxiliary data encoder 106 and auxiliary information extracted by the auxiliary data decoder 108. The example auxiliary data manager 110 maintains (e.g., logs) a record of the parties to whom data is distributed and the auxiliary information encoded into the data provided to the parties. Thus, the example auxiliary data manager 110 can determine a party to whom data including a particular watermark was distributed. In some examples, the auxiliary data manager 110 provides encoding information to the auxiliary data encoder 106 to control a method with which the auxiliary data is encoded into the database keys. Example information to control the method of encoding includes a base number or algorithm with which the auxiliary data is to be transformed or converted to a code. The example auxiliary data manager 110 may provide decoding information to the auxiliary data decoder 108 to enable the auxiliary data decoder 108 to extract the auxiliary information. Example decoding information includes the base number or algorithm to obtain the auxiliary data from a code and/or a set of incremental values (e.g., divisors, moduli) to obtain the code from a database keys.

In some examples, the auxiliary data manager 110 identifies the data as having been distributed from the database 102 or otherwise encoded via the auxiliary data encoder 106 when a match exists between auxiliary information provided to the auxiliary data encoder and auxiliary information extracted by the auxiliary data decoder 108.

Figure 2:
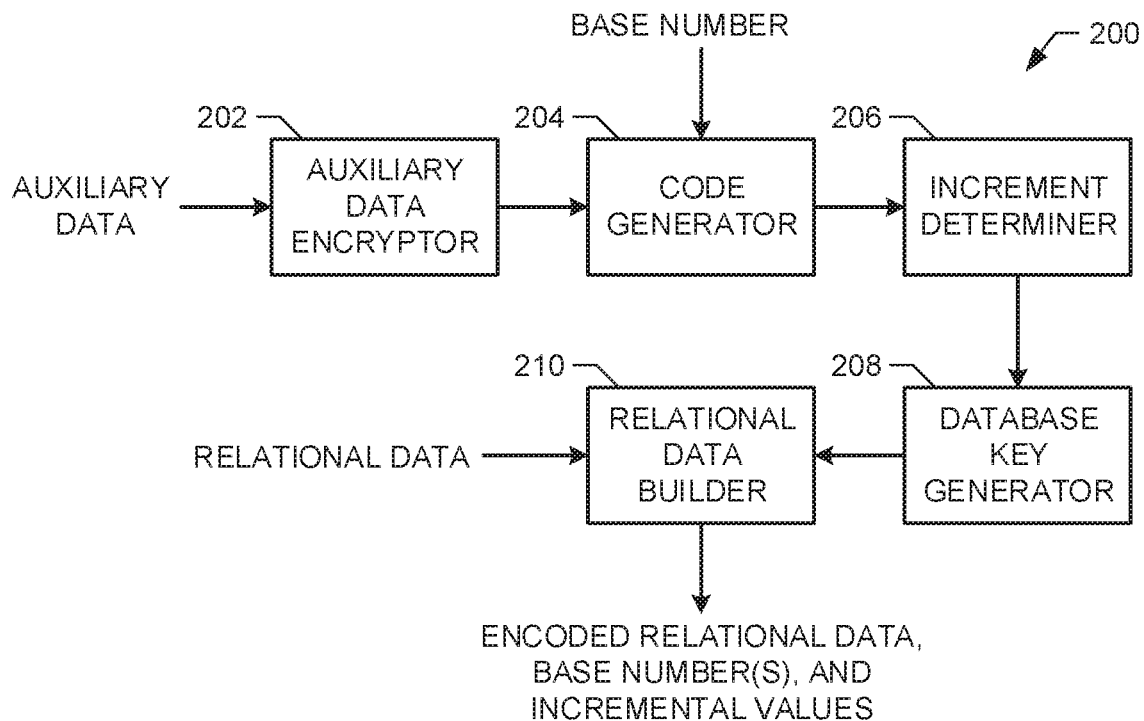
FIG. 2 is a more detailed block diagram of an example auxiliary data encoder to implement the system of FIG. 1 in accordance with the teachings of this disclosure.

FIG. 2 is a more detailed block diagram of an example auxiliary data encoder 200 to implement the system 100 of FIG. 1. The example auxiliary data encoder 200 of FIG. 2 may implement the auxiliary data encoder 106 of FIG. 1 to encode auxiliary data into database keys and/or to generate database keys having encoded data.

The example auxiliary data encoder 200 of FIG. 2 includes an auxiliary data encryptor 202, a code generator 204, an increment determiner 206, a database key generator 208, and a relational data builder 210. The example auxiliary data encoder 200 receives auxiliary data and a base number (e.g., from the auxiliary data manager 110 of FIG. 1) and relational data (e.g., from the database 102). The auxiliary data encoder 200 outputs encoded relational data. In some examples, the encoded relational data includes unencoded data items and generated database keys encoded with the auxiliary data.

The example auxiliary data encryptor 202 of FIG. 2 receives the auxiliary data to be encoded. The auxiliary data encryptor 202 encrypts the auxiliary data. Encrypting the auxiliary data may cause the auxiliary data to be more difficult to detect and/or decode from the encoded relational data. In some examples, the auxiliary data encryptor 202 is omitted and the code generator 204 receives the auxiliary data to be encoded.

The example code generator 204 of FIG. 2 receives the encrypted auxiliary data from the auxiliary data encryptor 202 and receives a base number. Using the base number, the example code generator 204 generates a code from the auxiliary data (encrypted or unencrypted). For example, the code generator 204 may split the auxiliary data into multiple groups, where each group is representative of a portion (e.g., a character) of the auxiliary data. Each example group includes a value and/or a symbol that can be converted to a numeric value (e.g., a decimal, binary, or hexadecimal ASCII representation of an alphanumeric character). In some examples, the code generator 204 splits the auxiliary data into a number of groups equal to the number of characters in the auxiliary data.

The code generator 204 of FIG. 2 subtracts the base number from each of the groups to obtain a code. In some examples the code generator 204 receives a base algorithm to control the method with which the code is generated from the encrypted auxiliary data. In some other examples, the code generator 204 receives multiple base numbers corresponding to the multiple groups and subtracts from each group its corresponding base number to obtain the code.

Figure 3:
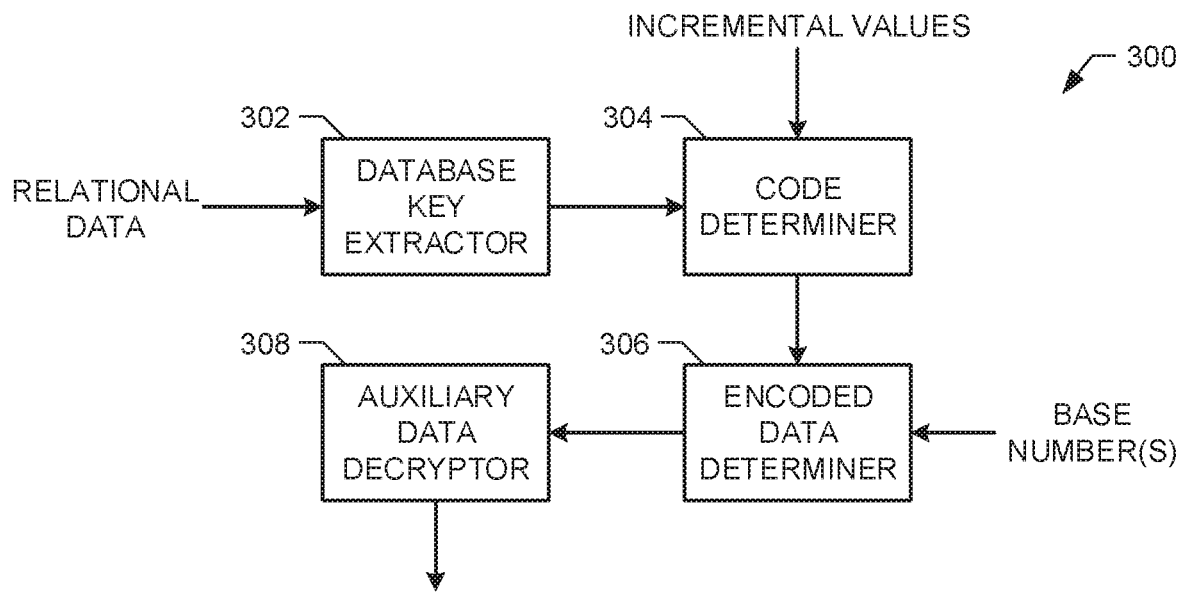
FIG. 3 is a more detailed block diagram of an example auxiliary data decoder to implement the system of FIG. 1 in accordance with the teachings of this disclosure.

The example increment determiner 206 of FIG. 2 receives the code from the code generator 204 and determines increment values (e.g., divisors) for each of the groups in the code. In the example of FIG. 3, to determine the increment value for a group, the increment determiner 206 determines the value of the group and selects the lowest prime number greater than the value of the group. By using prime numbers, the example increment values may reduce the chances of the auxiliary data decoder 108 of FIG. 1 erroneously determining auxiliary data from the keys. However, the increment determiner 206 may determine the value of the group using any method.

The example increment determiner 206 further determines an upper (e.g., maximum) value for each of the groups when incrementing the group by the increment value. The upper value for a group may be, but is not necessarily, a maximum value of the group having a designated number of figures (e.g., digits, bits, etc.). For example, a 4-digit decimal number group has a maximum possible value of 9999 when incrementing by 1 (and/or certain other numbers), but may have a lesser upper value when beginning from the group value of the code and incrementing by the increment value for the group (e.g., an upper value of 9995 when the group value for the code is 0006, there are 4 digits in the group, and the increment value is 7).

The example database key generator 208 receives the code and the increment values from the example increment determiner 206 and generates database keys for relational data. The database key generator 208 provides the generated keys to the relational data builder 210. In some examples, the database key generator 208 generates and provides key(s) in response to requests from the relational data builder 210 as the builder 210 builds a database of encoded relational data.

To generate a key, the example database key generator 208 uses the code and/or a previously-generated key and increments the group by the increment value for the group. For example, the database key generator 208 may use a most recently-generated database key and increment a first group by the increment value. After incrementing, the example database key generator 208 outputs the resulting value as a database key. In some examples, the database key generator 208 increments the group in an order, where a second group is incremented by the increment value for the second group only when a first group is equal to an upper value for the first group. Similarly, a third group may be incremented only when both the first and second groups are equal to respective upper values for the first and second groups. Thus, the groups of a subsequent key differ from the corresponding groups of a previous key by multiple of the corresponding incremental values for the groups.

The example relational data builder 210 assigns the database keys generated by the database key generator 208 to relational data to generate encoded relational data. The encoded relational data may be distributed to requesting parties and/or stored for later distribution. The auxiliary data may be obtained or extracted from the encoded relational data, or even small portions of the encoded relational data (e.g., one database key, or multiple database keys to provide verification), provided the relational data retains the database keys generated by the database key generator 208.

FIG. 3 is a more detailed block diagram of an example auxiliary data decoder 300 to implement the system 100 of FIG. 1. The example auxiliary data decoder 300 of FIG. 3 may implement the auxiliary data decoder 108 of FIG. 1 to extract or decode auxiliary data from encoded relational data, such as the encoded relational data generated by the example auxiliary data encoder 200 of FIG. 2.

The example auxiliary data decoder 300 of FIG. 3 includes a database key extractor 302, a code determiner 304, an encoded data determiner 306, and an auxiliary data decryptor 308. The database key extractor 302 of FIG. 3 receives relational data (e.g., encoded or unencoded relational data) to be decoded to obtain auxiliary data. For example, a set or subset of relational data (e.g., measurement data) that is suspected (or known) to have been owned or sourced by a first party is found in the possession of another party not authorized to possess the data. The example database key extractor 302 extracts the database keys from the relational data.

The example code determiner 304 receives the database keys from the relational data and receives incremental values to determine a code from the database keys. In the example of FIG. 3, the code determiner 304 receives the incremental values from the auxiliary data manager 110 of FIG. 1.

The example code determiner 304 splits the received database key into multiple groups. In some other examples, the code determiner 304 receives the database key as a number of groups from the database key extractor 302. The code determiner 304 performs a modular arithmetic operation on the database key using the incremental values corresponding to the groups to obtain a code.

The example encoded data determiner 306 receives the code from the code determiner and base number(s) (e.g., from the auxiliary data manager 110). The example base number(s) may correspond to the incremental values received by the code determiner 304. In an example in which a single base number is used, the encoded data determiner 306 modifies the value of each group by the base number (e.g., adds and/or multiplies the base number and the group, subtracts and/or divides the base number from the group, etc.). The encoded data determiner 306 determines the resulting group values to be the encoded data. In some examples, the encoded data determiner 306 receives a base algorithm, instead of base number(s), with which to determine the encoded data from the code.

The example auxiliary data decryptor 308 of FIG. 3 decrypts the encoded data determined by the encoded data determiner 306 to obtain the encoded auxiliary data. In some examples, the auxiliary data decryptor 308 receives an encryption key for use in decrypting the encoded data. In some examples, the auxiliary data decryptor 308 may be omitted or bypassed when the auxiliary data encoded in the relational data is not encrypted (e.g., the encoded data is the auxiliary data).

In some examples, the code determiner 304 and the encoded data determiner 306 receive multiple combinations of base number(s) and/or incremental values from the auxiliary data manger 110 when, for example, the relational data may have been encoded with one of the combinations of base number(s) and incremental values. In some of these examples, the code determiner 304, the encoded data determiner 306, and/or the auxiliary data decryptor 308 iterate processing of a database key with different combinations of incremental values, base numbers, and/or encryption keys and/or methods. When recognizable (e.g., coherent, intelligible, matching, etc.) auxiliary data is found using a set of base numbers, incremental values, and/or encryption keys, the example code determiner 304, the example encoded data determiner 306, and/or the example auxiliary data decryptor 308 use the combination to evaluate additional keys to verify the presence of the auxiliary data.

Figure 4:
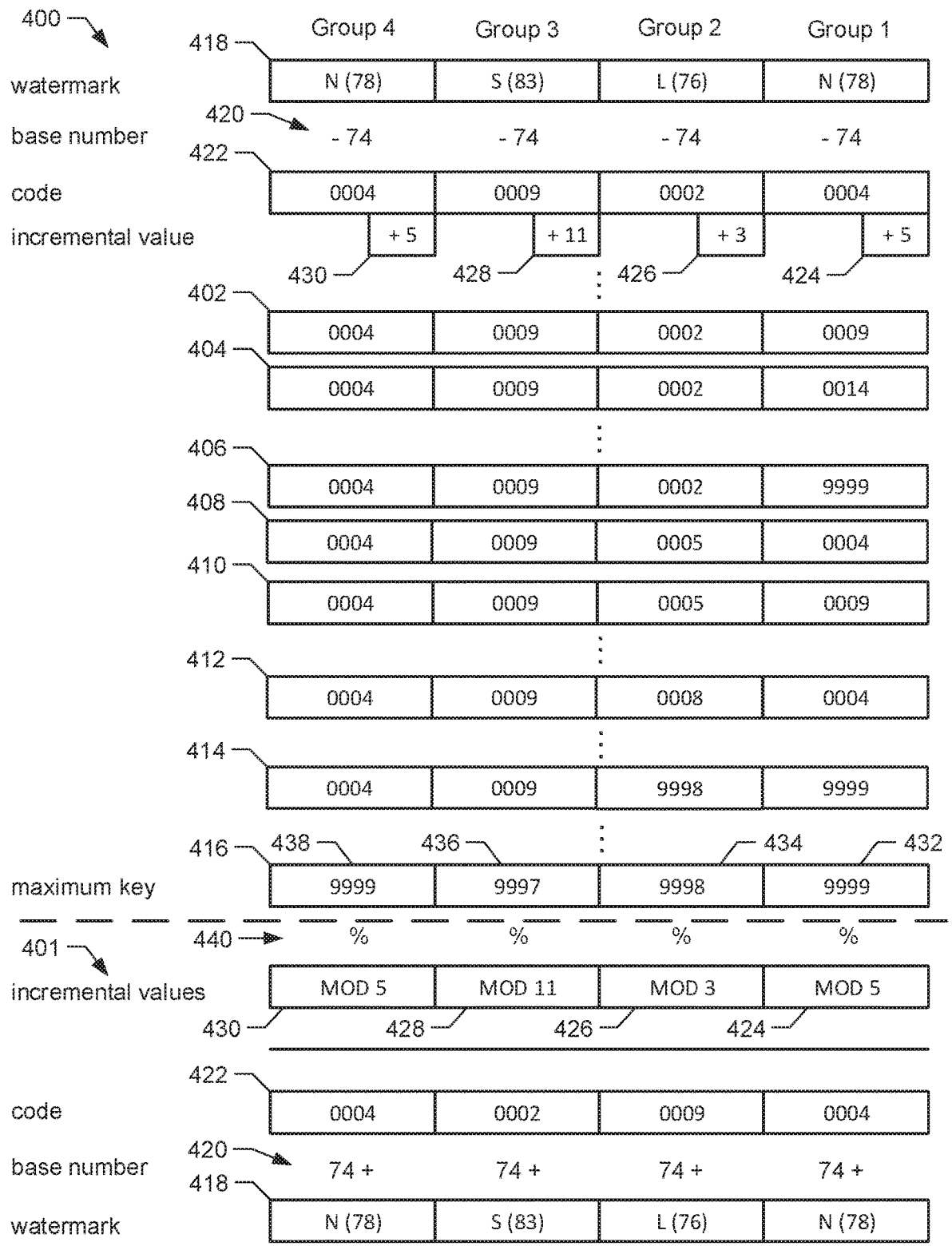
FIG. 4 illustrates an example process to generate database keys, including auxiliary data, for relational data, and to obtain the auxiliary data from the database keys in accordance with the teachings of this disclosure.

FIG. 4 illustrates an example process to generate database keys 402-416, including auxiliary data 418, for relational data, and to obtain the auxiliary data 418 from the database keys 402-416. The example of generating 400 the database keys 402-416 encoded with the auxiliary data 418 and obtaining 401 the auxiliary data 418 from the database keys 402-416 illustrated in FIG. 4 is described herein with reference to the auxiliary data encoder 200 and the auxiliary data decoder 300 of FIGS. 2 and 3. For the sake of clarity, the example auxiliary data 418 is not encrypted in the example of FIG. 4.

The example code generator 204 of FIG. 2 receives the auxiliary data 418 (e.g., a watermark) and a base number 420. In the example of FIG. 4, the auxiliary data 418 includes an ASCII decimal representation of the character sequence "NLSN" (e.g., 78, 76, 83, 78) and the base number 420 is the value "74" (or "–74"). The code generator 204 splits the auxiliary data into groups, each group including one of the characters of the auxiliary data 418. Thus, in the example of FIG. 4 the auxiliary data is split into 4 groups. The example code generator 204 subtracts the base number 420 "74" from the decimal value of each of the groups and converts the result to a 4-digit number to obtain a code 422. In the example of FIG. 4, the code 422 includes a four-digit number for each group, for a total of 16 decimal digits per group. Group 1 is the rightmost (e.g., least significant) group in the code 422, Group 2 is the next rightmost group, and so on to Group 4 as the leftmost group. Thus, the example code 422 representative of the watermark in FIG. 4 is "0004000900020004."

The example increment determiner 206 of FIG. 2 determines incremental values 424-430 for each of the groups 1-4. In the example of FIG. 4, the increment determiner 206 determines the incremental values 424-430 to be the lowest prime number greater than the respective value of the code 422 for each of the Groups 1-4. Thus, the example incremental values 424, 430 for each of Groups 1 and 4 is 5, which is the lowest prime number greater than the value of the code 422 (e.g., 4) for Groups 1 and 4. Similarly, the incremental value 428 for Group 3 is 11, which is the lowest prime number greater than the respective value of the code 422 (e.g., 9) for Group 3.

The example increment determiner 206 also determines upper values 432-438 for each of the example Groups 1-4. The upper value 432-438 for a group is the highest 4-digit decimal number into which the incremental value for the respective group (e.g., 5 for Group 1, 3 for Group 2, etc.) can be divided to obtain as a remainder the value of the code 422 for the respective group (e.g., 4 for Group 1, 2 for Group 2, etc.). In the example of FIG. 4, each of the Groups 1-4 is a 4-digit number and has a first number based on the code 422. Using the code and the incremental values 424-430, the increment determiner 206 determines the upper values 432-438 and, thus, the maximum database key value 416 that may be generated to be 9999 9997 9998 9999. The maximum database key value is the key value generated by combining the upper values 432-438.

Using the code 422 and the incremental values 424-430, the example database key generator 208 generates a first key 402 by incrementing the code 422 by the incremental value 424 of Group 1 (e.g., 5). Accordingly, the database key generator 208 generates the first database key 402 to be 0004 0009 0002 0009 (broken into groups for visual clarity). The database key generator 208 generates a second key 404 by incrementing the value of the previous key 402 by the incremental value 424 of Group 1, resulting in a key value of 0004 0009 0002 0014. The example database key generator 208 continues generating keys by incrementing the previous key by the incremental value 424 until the Group 1 value of the key is equal to the upper value 432 for Group 1. (e.g., 9999). The relational data builder 210 uses the generated keys as data keys to build relational data for distribution (e.g., to the requesting party 112 of FIG. 1) and/or storage (e.g., in the database 102 of FIG. 1).

When the value of Group 1 of the database key is equal to the upper value 432 (e.g., database key 406), the example database key generator 208 of FIG. 2 generates the next database key 408 by incrementing the value of Group 2 by the incremental value 426 (e.g., 3) and resetting the value of Group 1 to an initial value (e.g., the value of Group 1 in the code 422, or 0004). The example database key generator 208 then generates a subsequent database key 410 by incrementing the Group 1 value by the incremental value 424. The database key generator 208 continues to generate database keys 412, 414 by incrementing the group values by the respective incremental values 424-430 until the maximum database key value 416 is reached. In some examples, the relational data builder 210 finishes building the encoded relational data prior to the database key generator 208 generating the maximum key value 416.

In some examples, the database key generator 208 generates some or all possible encoded database keys 402-416. The example relational data builder 210 pseudorandomly selects from the database keys 402-416 to build the relational data.

A modular arithmetic operation performed using the incremental values 424-430 on any of the example database keys 402-416 results in the same value. Thus, the auxiliary data 418 may be obtained from any of the generated database keys 402-416 of FIG. 4. To obtain the auxiliary data 418 from the example database keys 402-416, the example database key extractor 302 extracts the key(s) 402-416 from relational data that includes the keys 402-416. The code determiner 304 receives the incremental values 424-430 and, for example, the key 414. The example code determiner 304 performs modular arithmetic operations 440 on the group values of the key 414 using the incremental values 424-430 as the bases (e.g., divisors, moduli) of the operations. The result of the operations 440 on the example key 414 (e.g., the remainders) yields the code 422.

The example encoded data determiner 306 of FIG. 3 receives the code 422 and the base number 420. In the example of FIG. 4, the encoded data determiner 306 adds the base number 420 to the value of each group 1-4 of the code 422 to obtain the decimal values for each group 1-4. By converting the decimal values to characters (e.g., by ASCII mapping), the example encoded data determiner 306 determines the auxiliary data 418 encoded into the relational data (e.g., in the database key 414).

The example code determiner 304 and the example encoded data determiner 306 may process additional ones of the keys 402-416 to verify the presence of the auxiliary data 418.

While example manners of implementing the system 100 of FIG. 1 has been illustrated in FIGS. 2 and/or 3, one or more of the elements, processes and/or devices illustrated in FIGS. 2 and/or 3 may be combined, divided, re-arranged, omitted, eliminated and/or implemented in any other way. Further, the example database 102, the example data request receiver 104, the example auxiliary data manager 110, the example auxiliary data encryptor 202, the example code generator 204, the example increment determiner 206, the example database key generator 208, the example relational data builder 210, the example database key extractor 302, the example code determiner 304, the example encoded data determiner 306, the example auxiliary data decryptor 308 and/or, more generally, the example auxiliary data encoder 106, 200 and/or the example auxiliary data decoder 108, 300 of FIGS. 1-3 may be implemented by hardware, software, firmware and/or any combination of hardware, software and/or firmware. Thus, for example, any of the example database 102, the example data request receiver 104, the example auxiliary data manager 110, the example auxiliary data encryptor 202, the example code generator 204, the example increment determiner 206, the example database key generator 208, the example relational data builder 210, the example database key extractor 302, the example code determiner 304, the example encoded data determiner 306, the example auxiliary data decryptor 308 and/or, more generally, the example auxiliary data encoder 106, 200 and/or the example auxiliary data decoder 108, 300 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example database 102, the example data request receiver 104, the example auxiliary data manager 110, the example auxiliary data encryptor 202, the example code generator 204, the example increment determiner 206, the example database key generator 208, the example relational data builder 210, the example database key extractor 302, the example code determiner 304, the example encoded data determiner 306, and/or the example auxiliary data decryptor 308 are hereby expressly defined to include a tangible computer readable storage medium such as a memory, DVD, CD, Blu-ray, etc. storing the software and/or firmware. Further still, the example the example auxiliary data encoder 106, 200 and/or the example auxiliary data decoder 108, 300 of FIGS. 1-3 may include one or more elements, processes and/or devices in addition to, or instead of, those illustrated in FIGS. 1-3, and/or may include more than one of any or all of the illustrated elements, processes and devices.

Figure 5:
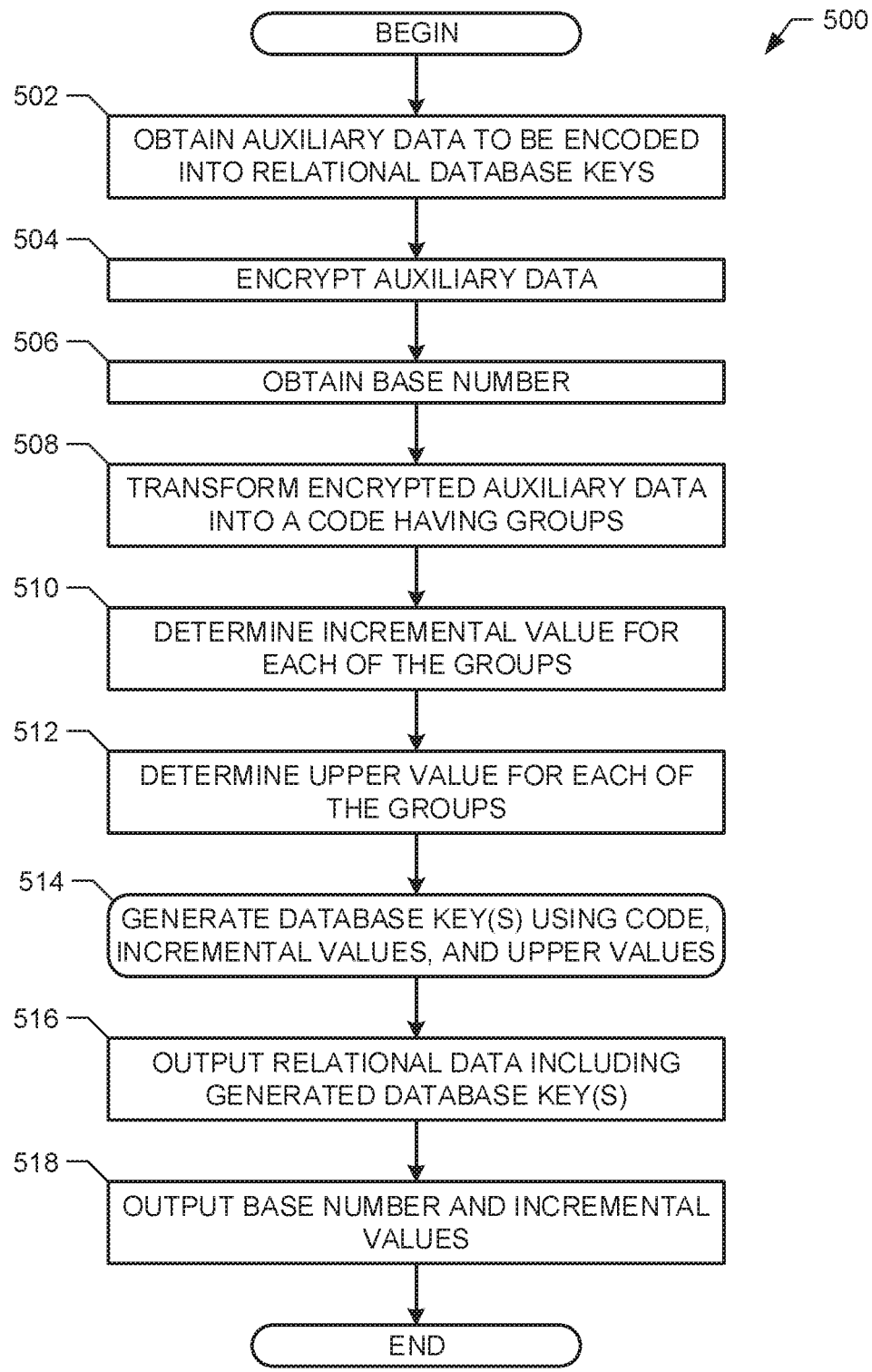
FIG. 5 is a flowchart representative of example machine readable instructions that may be executed to implement the auxiliary data encoder of FIG. 2 to encode auxiliary data into relational database keys in accordance with the teachings of this disclosure.
Figure 6:
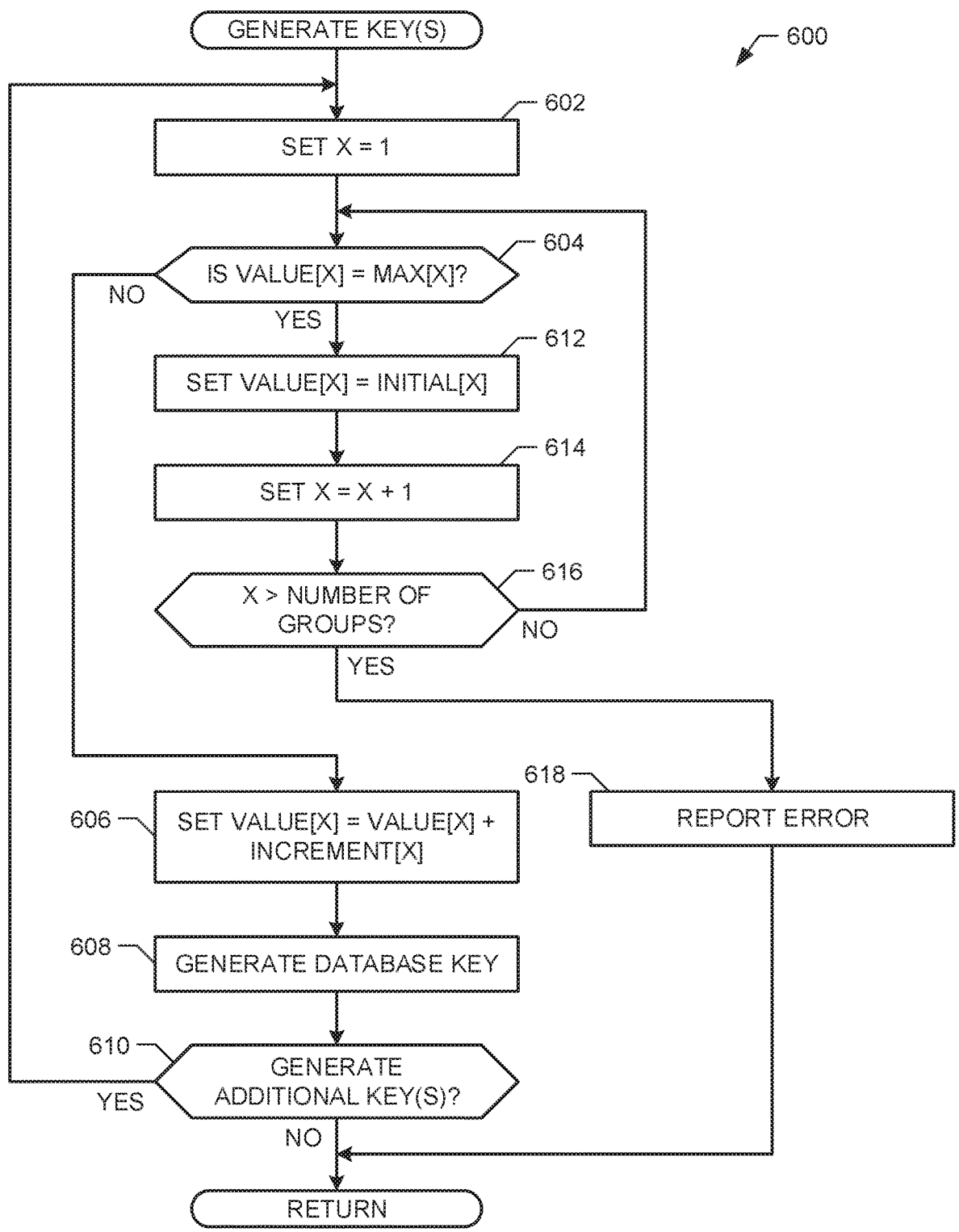
FIG. 6 is a flowchart representative of example machine readable instructions that may be executed to implement the auxiliary data encoder of FIG. 2 to generate database keys including auxiliary data in accordance with the teachings of this disclosure.
Figure 7:
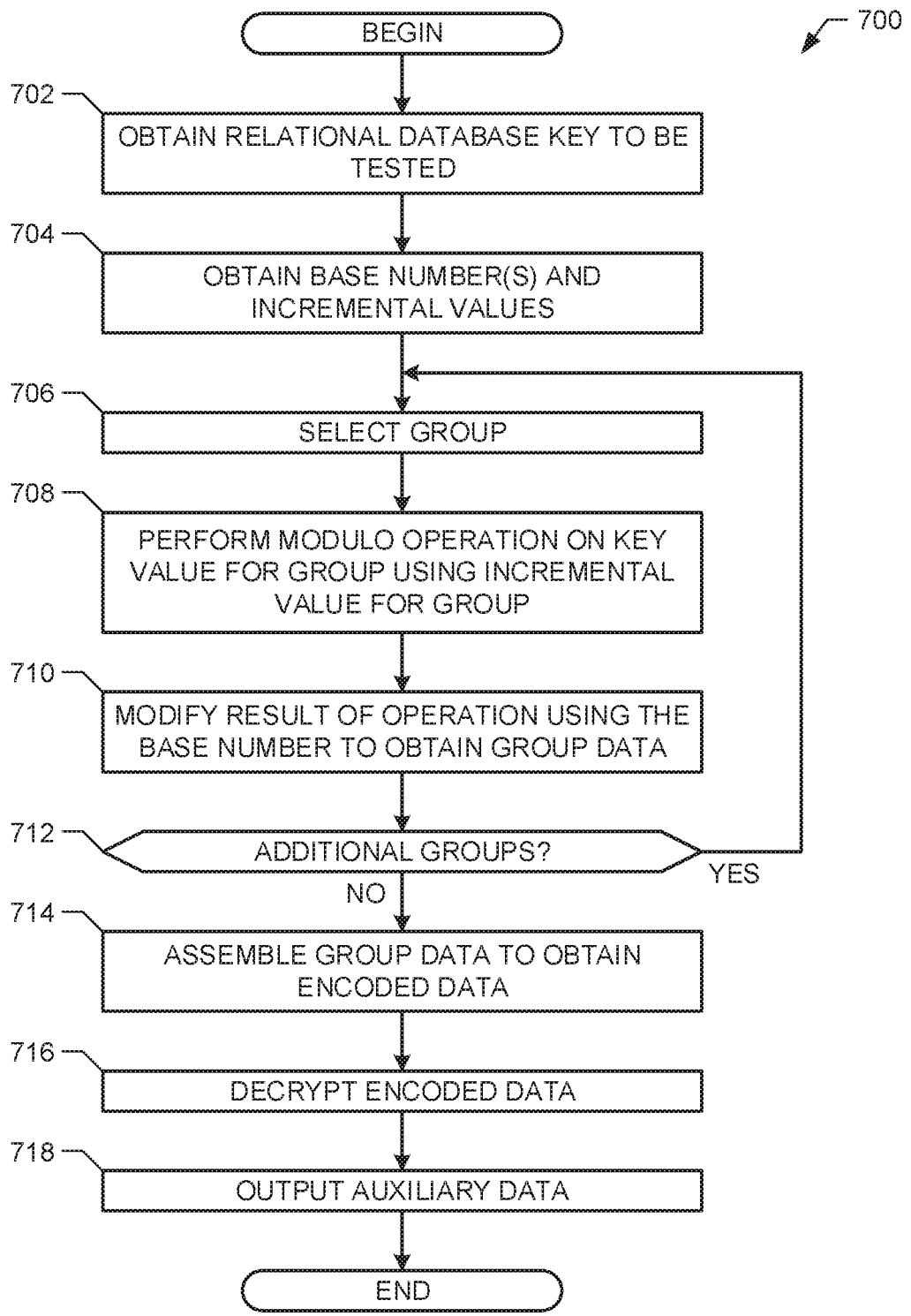
FIG. 7 is a flowchart representative of example machine readable instructions that may be executed to implement the auxiliary data decoder of FIG. 3 to obtain auxiliary data encoded into relational database keys in accordance with the teachings of this disclosure.

Flowcharts representative of example machine readable instructions for implementing the example auxiliary data encoder 200 of FIG. 2 are shown in FIGS. 5 and 6. A flowchart representative of example machine readable instructions for implementing the example auxiliary data decoder 300 of FIG. 3 is shown in FIG. 7. In this example, the machine readable instructions comprise programs for execution by a processor such as the processor 812 shown in the example computer 800 discussed below in connection with FIG. 8. The programs may be embodied in software stored on a tangible computer readable storage medium such as a CD-ROM, a floppy disk, a hard drive, a digital versatile disk (DVD), a Blu-ray disk, or a memory associated with the processor 812, but the entire programs and/or parts thereof could alternatively be executed by a device other than the processor 812 and/or embodied in firmware or dedicated hardware. Further, although the example programs are described with reference to the flowcharts illustrated in FIGS. 5, 6, and 7, many other methods of implementing the example auxiliary data encoder 200 and/or the example auxiliary data decoder 300 may alternatively be used. For example, the order of execution of the blocks may be changed, and/or some of the blocks described may be changed, eliminated, or combined.

As mentioned above, the example processes of FIGS. 5, 6, and 7 may be implemented using coded instructions (e.g., computer readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable storage medium is expressly defined to include any type of computer readable storage and to exclude propagating signals. Additionally or alternatively, the example processes of FIGS. 5, 6, and 7 may be implemented using coded instructions (e.g., computer readable instructions) stored on a non-transitory computer readable storage medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable storage medium is expressly defined to include any type of computer readable storage medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

FIG. 5 is a flowchart representative of example machine readable instructions 500 which may be executed to implement the auxiliary data encoder 200 of FIG. 2 to encode auxiliary data into relational database keys. The example instructions 500 may be performed, for example, to embed a watermark, such as an identifier or copyright information, into the relational data prior to providing the data to another party.

The example instructions 500 of FIG. 5 begin by obtaining (e.g., at the auxiliary data encryptor 202 of FIG. 2) auxiliary data (e.g., the auxiliary data 418 of FIG. 4) to be encoded into relational database keys (block 502). The auxiliary data may be any type of data, such as alphanumeric encoded characters, an identification number, a serial number, and/or any other data. The example auxiliary data encryptor 202 encrypts the auxiliary data (block 504).

The example code generator 204 of FIG. 2 obtains a base number (block 506). In some examples, the code generator 204 receives multiple base numbers and/or base algorithms from the example auxiliary data manager 110 of FIG. 1. The code generator 204 transforms the encrypted auxiliary data into a code (e.g., the code 422 of FIG. 4) having multiple groups (block 508). For each of the groups of the code 422, the example increment determiner 206 of FIG. 2 determines an incremental value (e.g., the incremental values 424-430) (block 510). In some examples, the incremental values 424 are prime numbers, such as the lowest prime number that is greater than a value of the respective group of the code 422. The example increment determiner 206 of FIG. 2 also determines an upper value (e.g., the upper values 432-438) for each of the groups (block 512).

Using the code 422, the incremental values 424-430, and the upper values 432-438, the example database key generator 208 of FIG. 2 generates database key(s) (e.g., the database key(s) 402-416 of FIG. 4) (block 514). Example instructions to implement block 514 are disclosed below in conjunction with FIG. 6.

The example relational data builder 210 outputs relational data including the generated database key(s) (block 516). For example, the relational data builder 210 may build the relational data using the generated database key(s) and output the relational data to a requesting party and/or for storage (e.g., in the database 102 of FIG. 1). The example relational data builder 210 (and/or the database key generator 208) outputs the base number(s) and the incremental values (block 518). The base number(s) and the incremental values may be subsequently used by the auxiliary data decoder 300 of FIG. 3 to obtain encoded information from the relational data. The example instructions 500 may then end and/or iterate to encode auxiliary data into additional relational data.

FIG. 6 is a flowchart representative of example machine readable instructions 600 which may be executed to implement the auxiliary data encoder 200 of FIG. 2 to generate database keys including auxiliary data. The example instructions 600 may be performed, for example, to implement or perform block 514 of FIG. 5.

The example instructions 600 of FIG. 6 will be described below, with reference to several arrays or sets of information, to describe an example method or algorithm used by the example database key generator 208 of FIG. 2 to generate database keys. As used with reference to FIG. 6, an array VALUE[n] includes the value of a group n for the most recently-generated database key, where n ranges between 1 and the number of groups in the database keys (e.g., the number of groups in the code 422 of FIG. 4). Thus, VALUE[1] is the value of group 1 in the most recently generated database key. Each time the database key generator 208 generates a database key, the array VALUE[n] is updated. As used with reference to FIG. 6, an array MAX[n] includes the upper value of a group n (e.g., the upper values 432-438 of FIG. 4), where n ranges between 1 and the number of groups in the database keys. As used with reference to FIG. 6, an array INITIAL[n] includes the value of a group n in the initial code (e.g., the code 422 of FIG. 4 determined by the code determiner 206 of FIG. 2), where n ranges between 1 and the number of groups in the database keys. As used with reference to FIG. 6, an array INCREMENT[n] includes the incremental value of a group n (e.g., the incremental values 424-430 of FIG. 4 determined by the code determiner 206 of FIG. 2), where n ranges between 1 and the number of groups in the database keys.

The example instructions 600 begin by setting a variable X equal to 1 (block 602). The example database key generator 208 determines whether the value of Group X in the most recently generated database key is equal to the upper value of Group X (e.g., determines whether VALUE[X]=MAX[X]) (block 604). If the value of Group X in the most recently generated database key is not equal to the upper value of Group X (e.g., VALUE[X] does not equal MAX[X]) (block 604), the example database key generator 208 increments the value of Group X by the incremental value of Group X (e.g., sets VALUE[X]=VALUE[X]+INCREMENT[X]) (block 606). The database key generator 208 then generates a database key composed of the groups including the incremented value(s) (block 608). The database key generator 208 determines whether additional keys are to be generated (block 610). If additional keys are to be generated, control returns to block 602 to reset X to be equal to 1.

If the value of Group X in the most recently generated database key is equal to the upper value of Group X (e.g., VALUE[X] does not equal MAX[X]) (block 604), the example database key generator 208 sets the value of Group X to be the value of the code for Group X (e.g., sets VALUE[X]=INITIAL[X]) (block 612). The database key generator 208 increments X by 1 (e.g., sets X equal to X+1) (block 614). The example database key generator 208 determines whether, after incrementing X (block 614), the value of X is greater than the number of groups (block 616). If X is not greater than the number of groups (block 616), control returns to block 604 to determine whether the value of Group X in the most recently generated database key is equal to the upper value of Group X. If X is greater than the number of groups (block 616), the example database key generator 208 reports an error or other indication that the database key generator 208 has reached the maximum database key value (block 618).

After reporting the error or indication (block 618), or if the database key generator 208 is to not generate additional keys (block 610), the example instructions 600 of FIG. 6 end and control returns to block 516 of FIG. 5 to output the relational data.

FIG. 7 is a flowchart representative of example machine readable instructions 700 which may be executed to implement the auxiliary data decoder 300 of FIG. 3 to obtain auxiliary data encoded into relational database keys. The example instructions 700 of FIG. 7 may be performed to, for example, identify copyrighted data and/or to extract information such as a watermark that is encoded into relational database keys.

The example database key extractor 302 of FIG. 3 obtains relational database key(s) to be tested (e.g., for encoded data) (block 702). In some examples, the database key extractor 302 receives relational data and extracts the keys from the data. The example code determiner 304 and/or the example encoded data determiner 306 obtain incremental values and base number(s) (block 704). For example, the incremental values and/or base number(s) may be obtained from the auxiliary data manager 110 of FIG. 1 for use in obtaining encoded auxiliary data from the relational data.

The example code determiner 304 of FIG. 3 selects a group (e.g., in a database key) (block 706). In some examples, the database key extractor 302 and/or the code determiner 304 split database keys into groups prior to selecting a group. The code determiner 304 performs a modular arithmetic operation (e.g., a modulo operation) on the key value for the selected group using the incremental value for the selected group as the base (e.g., the divisor, the modulus) (block 708). The example encoded data determiner 306 of FIG. 3 modifies the result of the operation (e.g., remainders) (block 708) using the base number to obtain group data (block 710). Thus, the encoded data determiner 306 determines the encoded data in the selected group.

If there are additional groups to be processed (block 712), control returns to block 706 to select the next group. When there are no additional groups to be processed (block 712), the example encoded data determiner 306 assembles the group data (e.g., the data encoded in each of the groups) to obtain the encoded data (block 714). For example, the encoded data determiner 306 may arrange the data encoded in the respective groups according to an arrangement of the groups.

Figure 8:
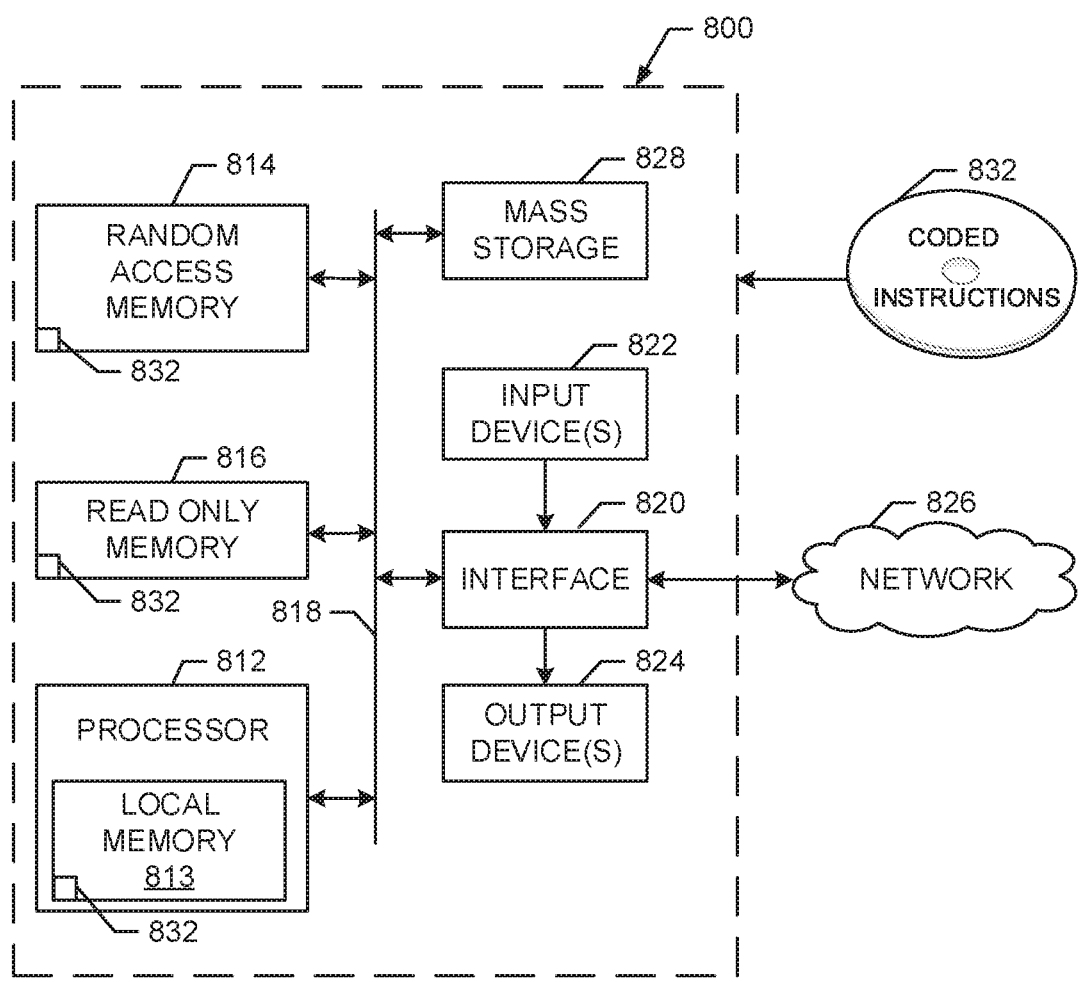
FIG. 8 is a block diagram of an example computer capable of executing the instructions of FIGS. 5, 6, and/or 7 to implement the apparatus of FIGS. 2 and/or 3.

The example auxiliary data decryptor 308 of FIG. 8 decrypts the encoded data to obtain the auxiliary data (block 716). The example auxiliary data decryptor 308 outputs the auxiliary data (block 718). In some examples, the output auxiliary data may be compared to auxiliary data that was previously encoded into relational data for distribution. The example instructions 700 may then end and/or iterate to verify the encoded information from another database key and/or to obtain auxiliary data from different relational data.

FIG. 8 is a block diagram of an example computer 800 capable of executing the instructions of FIGS. 5, 6, and 7 to implement the auxiliary data encoder 200 and/or the auxiliary data decoder 300 of FIGS. 1-3. The computer 800 can be, for example, a server, a personal computer, an Internet appliance, or any other type of computing device.

The system 800 of the instant example includes a processor 812. For example, the processor 812 can be implemented by one or more microprocessors or controllers from any desired family or manufacturer.

The processor 812 includes a local memory 813 (e.g., a cache) and is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The computer 800 also includes an interface circuit 820. The interface circuit 820 may be implemented by any type of interface standard, such as an Ethernet interface, a universal serial bus (USB), and/or a PCI express interface.

One or more input devices 822 are connected to the interface circuit 820. The input device(s) 822 permit a user to enter data and commands into the processor 812. The input device(s) can be implemented by, for example, a keyboard, a mouse, a touchscreen, a voice recognition system, and/or any other method of input or input device.

One or more output devices 824 are also connected to the interface circuit 820. The output devices 824 can be implemented, for example, by display devices (e.g., a liquid crystal display, a cathode ray tube display (CRT), a printer and/or speakers). The interface circuit 820, thus, typically includes a graphics driver card.

The interface circuit 820 also includes a communication device such as a modem or network interface card to facilitate exchange of data with external computers via a network 826 (e.g., an Ethernet connection, a digital subscriber line (DSL), a telephone line, coaxial cable, a cellular telephone system, etc.).

The computer 800 also includes one or more mass storage devices 828 for storing software and data. Examples of such mass storage devices 828 include floppy disk drives, hard drive disks, compact disk drives and digital versatile disk (DVD) drives. The mass storage device 828 may implement the database 102 of FIG. 1.

The coded instructions 832 of FIGS. 5, 6, and/or 7 may be stored in the mass storage device 828, in the volatile memory 814, in the non-volatile memory 816, and/or on a removable storage medium such as a CD or DVD.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An apparatus to decode encoded data from relational data, the apparatus comprising:
   memory;
   an interface to access network communications to obtain a relational database key value, a first base number, and a second base number, the relational database key value corresponding to encoded auxiliary data; and
   a processor to execute instructions to:
      divide the relational database key value into a first number of groups;
      determine first remainders for respective ones of the groups based on corresponding first incremental values;
      modify the first remainders using the first base number to generate first encoded values; and
      when the first encoded values do not correspond to a first result:
         determine second remainders for respective ones of the groups based on corresponding second incremental values; and
         modify the second remainders using Rail the second base number to obtain the encoded auxiliary data.

2. The apparatus of claim 1, wherein the processor is to:
   divide a second relational database key value into the first number of groups; and
   determine third remainders for the respective ones of the groups based on the corresponding second incremental values, the third remainders being equal to the first remainders for corresponding groups.

3. The apparatus of claim 1, wherein the processor is to modify the first remainders by at least one of adding, subtracting, multiplying, or dividing the first remainders with the first base number to obtain the encoded auxiliary data.

4. The apparatus of claim 1; wherein the processor is to:
   obtain the first incremental values; and
   determine the first remainders by performing a modulo operation on the groups using the first incremental values.

5. The apparatus of claim 1, wherein the processor is to assemble modified remainders corresponding to the groups to obtain the encoded auxiliary data.

6. The apparatus of claim 1, wherein the processor is to decrypt the encoded auxiliary data.

7. The apparatus of claim 1, wherein the processor is to obtain at least one of a plurality of base numbers or a plurality of incremental values.

8. A non-transitory computer readable storage medium comprising computer readable instructions which; when executed, cause a machine to at least:
   access network communications to obtain a relational database key value, a first base number, and a second base number, the relational database key value corresponding to encoded auxiliary data;
   divide the relational database key value into a first number of groups;
   determine first remainders for respective ones of the groups based on corresponding first incremental values;
   modify the first remainders using the first base number to generate first encoded values;
   when the first encoded values do not correspond to first auxiliary data:
      determine second remainders for respective ones of the groups based on corresponding second incremental values; and
      modify the second remainders using the second base number to obtain the encoded auxiliary data.

9. The non-transitory computer readable storage medium of claim 8, wherein the instructions are further to cause the machine to extract the relational database key value from relational data.

10. The non-transitory computer readable storage medium of claim 8, wherein the instructions cause the machine to:
    divide a second relational database key value into the first number of groups; and
    determine third remainders for the respective ones of the groups based on the corresponding second incremental values, the third remainders being equal to the first remainders for corresponding groups.

11. The non-transitory computer readable storage medium of claim 8, wherein the encoded auxiliary data includes a first number of alphanumeric characters.

12. The non-transitory computer readable storage medium of claim 8, wherein the instructions cause the machine to modify the first remainders by at least one of adding, subtracting, multiplying, or dividing the first remainders with the first base number to obtain the encoded auxiliary data.

13. The non-transitory computer readable storage medium of claim 8, wherein the instructions cause the machine to decrypt an encoded value including the modified remainders to obtain the encoded auxiliary data.

14. The non-transitory computer readable storage medium of claim 8, wherein the instructions cause the machine to obtain the first incremental values, and to determine the first remainders by performing modulo operations on the groups using the first incremental values.

15. The non-transitory computer readable storage medium of claim 8, wherein the instructions cause the machine to obtain at least one of a plurality of base numbers or a plurality of incremental values.

16. A method to decode auxiliary data from relational data, the method comprising:
    accessing network communications to obtain a relational database key value, a first base number, and a second base number, the relational database key value corresponding to encoded auxiliary data;

dividing, by executing an instruction with a processor, the relational database key value into a first number of groups;

determining, by executing an instruction with the processor, first remainders for respective ones of the groups based on corresponding first incremental values;

modifying, by executing an instruction with the processor, the first remainders using the first base number to generate first encoded values; and when the first encoded values do not correspond to a first result;

determining second remainders for respective ones of the groups based on corresponding second incremental values; and modifying the second remainders using the second base number to obtain the encoded auxiliary data.

17. The method of claim 16, further including extracting the relational database key value from relational data.

18. The method of claim 16, further including:

dividing a second relational database key value into the first number of groups; and determining third remainders for the respective ones of the groups based on the corresponding second incremental values, the third remainders being equal to the third remainders for corresponding groups.

19. The method of claim 16, further including decrypting an encoded value including the modified remainders to obtain the encoded auxiliary data.

20. The method of claim 16, further including obtaining the first incremental values, and determining the first remainders by performing modulo operations on the groups using the first incremental values.

* * * * *